US008662507B2

(12) United States Patent
Willey

(10) Patent No.: US 8,662,507 B2
(45) Date of Patent: Mar. 4, 2014

(54) SELF-ELEVATING AND SELF-LOWERING ASSEMBLY CART FOR TRANSPORTING A HOUSEHOLD APPLIANCE ASSEMBLY COMPONENT

(75) Inventor: Bradford Willey, New Bern, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 0 days.

(21) Appl. No.: 13/537,790

(22) Filed: Jun. 29, 2012

(65) Prior Publication Data

US 2014/0001722 A1 Jan. 2, 2014

(51) Int. Cl.
*B62B 11/00* (2006.01)

(52) U.S. Cl.
USPC ............... 280/47.35; 280/47.41; 414/331.14; 414/331.06; 211/13.1

(58) Field of Classification Search
USPC ............. 280/47.35, 79.11, 79.3, 79.7, 47.41, 280/755, 160; 187/240, 244; 206/386, 448, 206/449; 414/331.01, 331.14, 331.06, 630, 414/631, 785; 248/345.1, 346.01, 346.02; 211/41.11, 41.14, 85.8, 41.1, 13.1, 211/193; 108/51.11, 57.17, 57.2–57.24
See application file for complete search history.

(56) References Cited

U.S. PATENT DOCUMENTS

| | | | | |
|---|---|---|---|---|
| 1,051,452 | A * | 1/1913 | Rock | 211/174 |
| 1,272,175 | A * | 7/1918 | Albright | 211/41.1 |
| 1,682,078 | A * | 8/1928 | Hanlen | 187/401 |
| 1,777,694 | A * | 10/1930 | Halteman | 280/79.11 |
| 2,932,403 | A | 4/1960 | Vershbow | |
| 3,199,683 | A * | 8/1965 | Graswich | 211/41.1 |
| 3,272,528 | A * | 9/1966 | Young et al. | 280/33.996 |
| 3,511,548 | A * | 5/1970 | McIlhone | 312/71 |
| 3,635,173 | A * | 1/1972 | Ruben | 108/136 |
| 3,871,725 | A | 3/1975 | Vilen et al. | |
| 4,034,878 | A * | 7/1977 | Fox | 414/448 |
| 4,070,072 | A | 1/1978 | Skaller | |
| 4,426,011 | A * | 1/1984 | Jay | 211/193 |
| 4,582,739 | A * | 4/1986 | Givens | 428/83 |

(Continued)

FOREIGN PATENT DOCUMENTS

JP 03223025 A * 10/1991 ............. B65G 57/03

OTHER PUBLICATIONS

Lingsoe Library Systems, A/S "Ergo Volume" published 2009.

(Continued)

*Primary Examiner* — J. Allen Shriver, II
*Assistant Examiner* — Steve Clemmons
(74) *Attorney, Agent, or Firm* — James E. Howard; Andre Pallapies

(57) ABSTRACT

An unpowered, self-elevating and self-lowering home appliance assembly cart for supporting and transporting a plurality of home appliance assembly components, such as oven doors, including a base, and a self-leveling and self-lowering door suspension and supporting system having a mast, a rail system moveably coupled to the mast, a plurality of arms extending from the rail system, each pair of arms for supporting a home appliance assembly component, and a self-leveling and self-lowering device that automatically self-levels and self-lowers the pair of arms within a predetermined acceptable ergonomic work zone with respect to a vertical height along the mast based on an unloaded state, a partially loaded state, and a loaded state of the plurality of arms and without power assistance, the predetermined acceptable ergonomic work zone being for loading and unloading the home appliance assembly component from the pair of arms.

28 Claims, 11 Drawing Sheets

(56) References Cited

U.S. PATENT DOCUMENTS

| | | | | |
|---|---|---|---|---|
| 5,167,302 | A | * | 12/1992 | Kinoshita ............... 108/136 |
| D346,251 | S | * | 4/1994 | Morooka ................. D34/17 |
| 5,810,117 | A | * | 9/1998 | Wood ..................... 187/244 |
| 5,938,047 | A | * | 8/1999 | Ellis et al. ............... 211/1.57 |
| 6,035,973 | A | * | 3/2000 | Neal et al. ............... 187/244 |
| 6,089,382 | A | * | 7/2000 | Eros et al. ............... 211/13.1 |
| 6,095,348 | A | * | 8/2000 | Karashima ............... 211/175 |
| 6,129,224 | A | * | 10/2000 | Mingers .................. 211/193 |
| 6,364,330 | B1 | * | 4/2002 | Weber et al. ............. 280/47.35 |
| 6,390,308 | B1 | * | 5/2002 | Ebrahim .................. 211/85.3 |
| 6,394,738 | B1 | * | 5/2002 | Springer .................. 414/673 |
| 6,899,347 | B2 | * | 5/2005 | Neal et al. ............... 280/47.35 |
| 7,188,736 | B2 | * | 3/2007 | Choi ....................... 211/41.18 |
| 7,455,186 | B2 | * | 11/2008 | Gregory .................. 211/85.3 |
| 7,481,440 | B2 | * | 1/2009 | Weber et al. ............. 280/47.34 |
| 8,006,985 | B2 | * | 8/2011 | Facey et al. ............. 280/43.14 |
| 2002/0109319 | A1 | * | 8/2002 | Neal et al. ............... 280/47.35 |
| 2005/0067360 | A1 | * | 3/2005 | Darvial .................... 211/41.14 |
| 2005/0275179 | A1 | * | 12/2005 | Whittington ............. 280/79.11 |
| 2008/0310946 | A1 | * | 12/2008 | Allen ...................... 414/785 |
| 2011/0084459 | A1 | * | 4/2011 | Hergeth ................... 280/47.35 |
| 2011/0309044 | A1 | * | 12/2011 | Morrow ................... 211/59.2 |
| 2011/0309228 | A1 | * | 12/2011 | Cox et al. ................ 248/573 |
| 2012/0153588 | A1 | * | 6/2012 | Shokouhi ................. 280/79.2 |

OTHER PUBLICATIONS

Solutions Dynamics, Inc., Bishamon ESX Mobile Work Positioners, published 2009.

Vestil Manufacturing, "Vestil—Self Elevating Table", published 2002.

Raven Industries, ""Saracen" Self Elevating Table Trolley", published 2011.

Vestil Manufacturing, "Vestil—Auto-Hite Carts", Accessed Sep. 5, 2011.

* cited by examiner

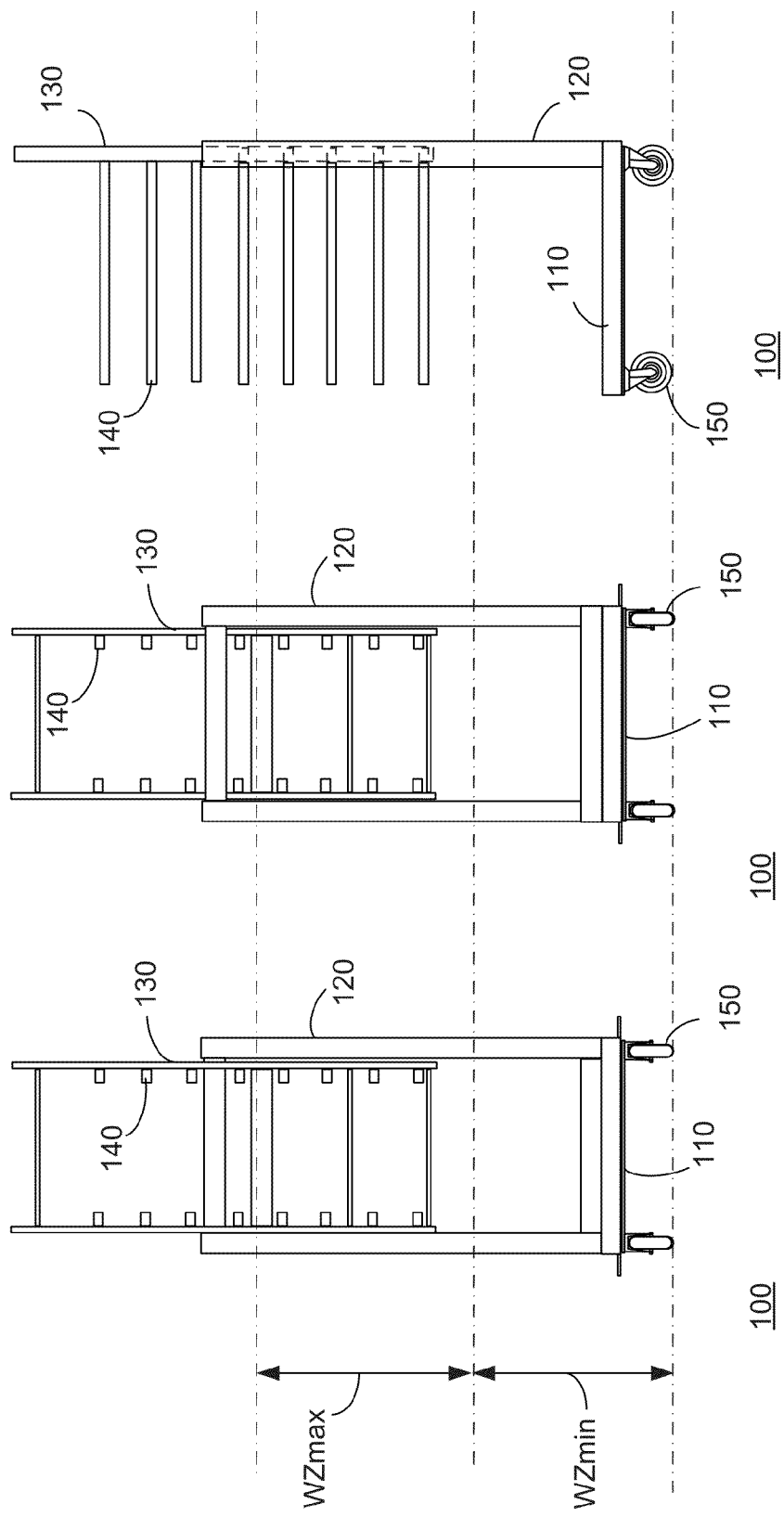

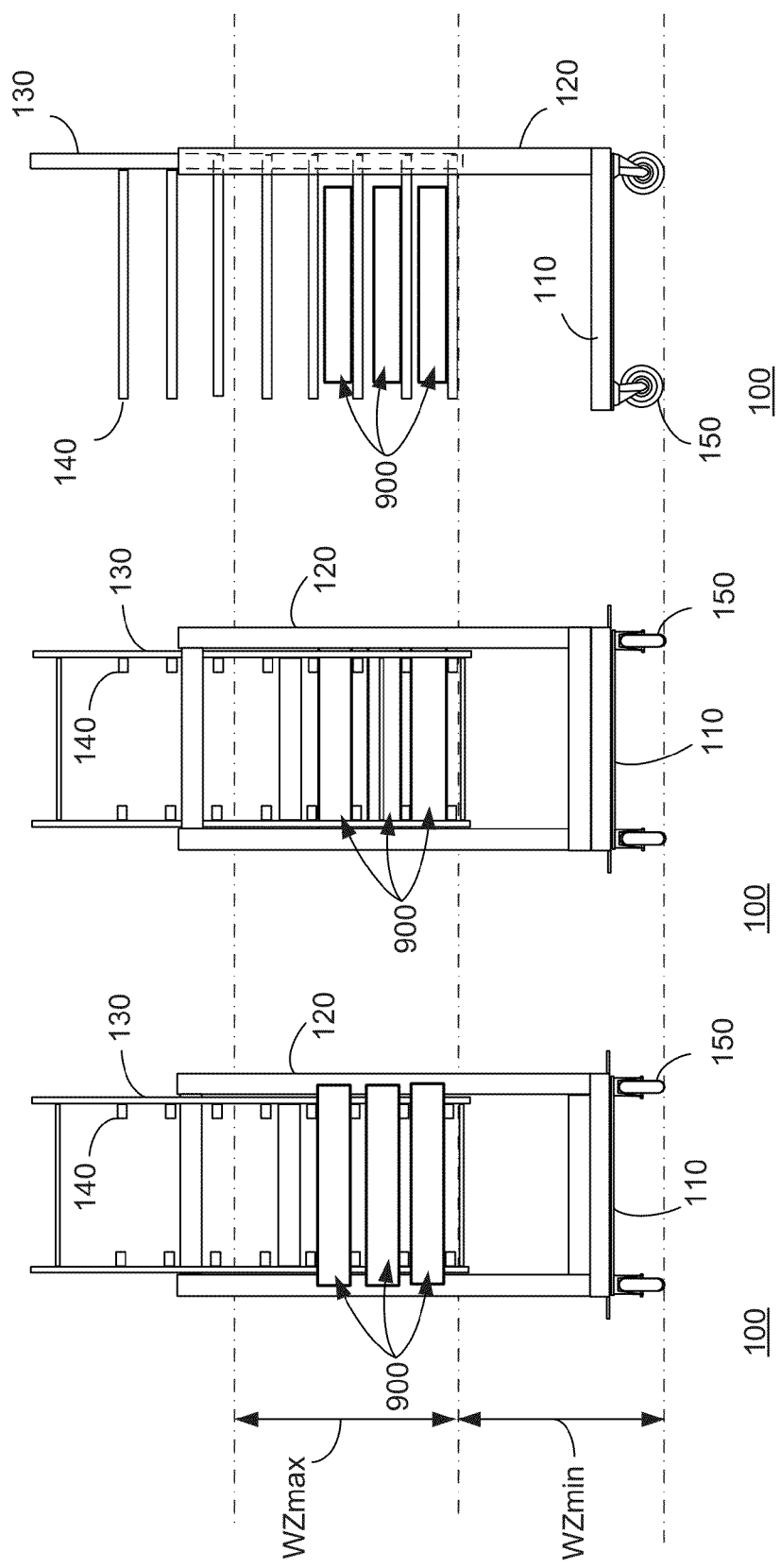

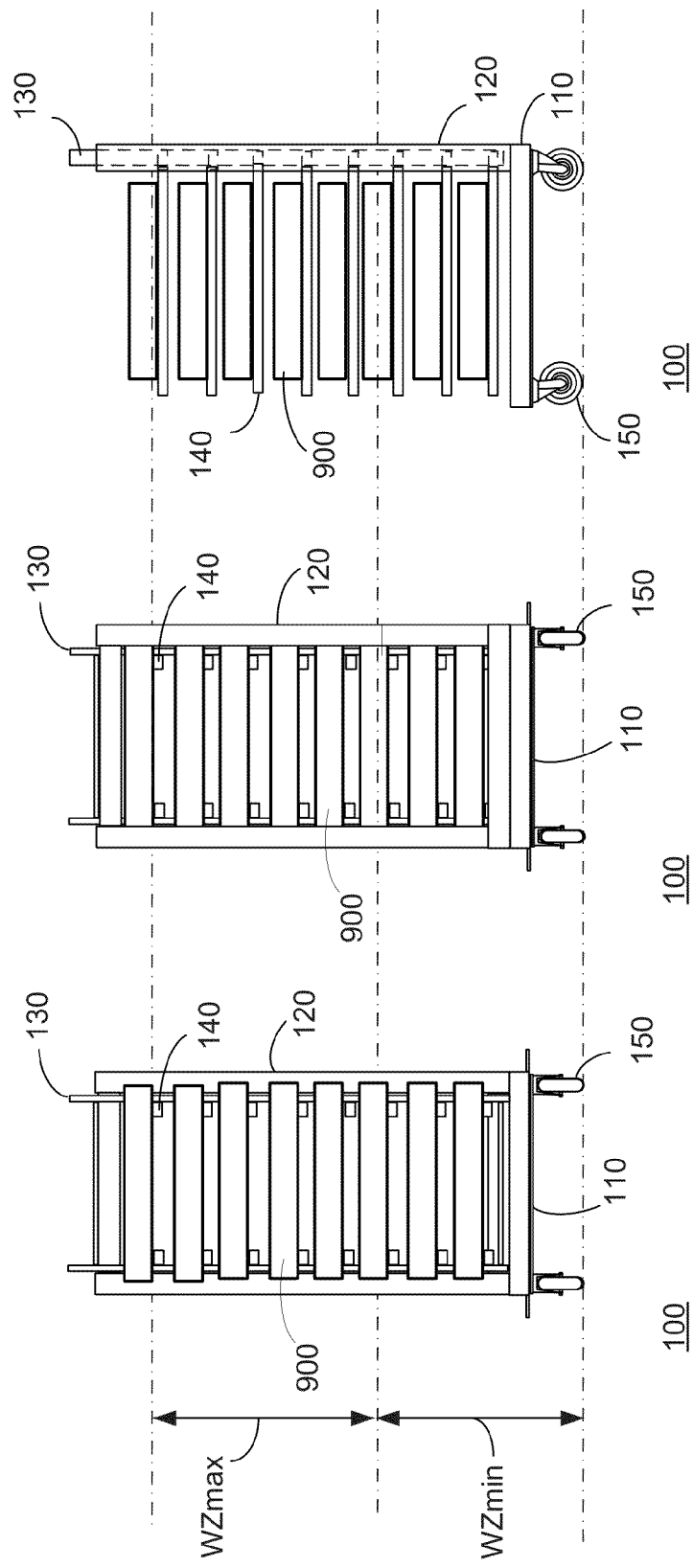

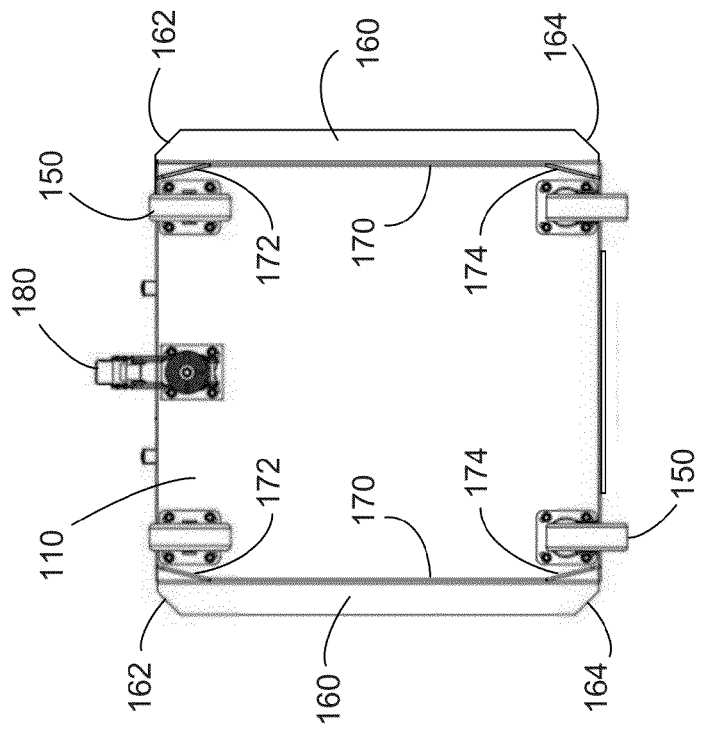
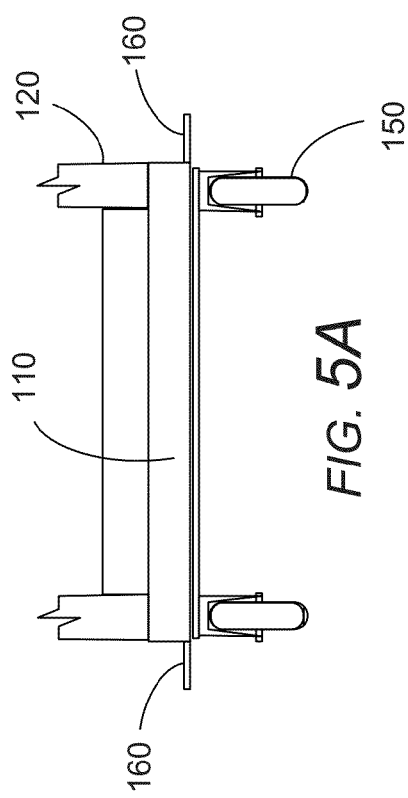
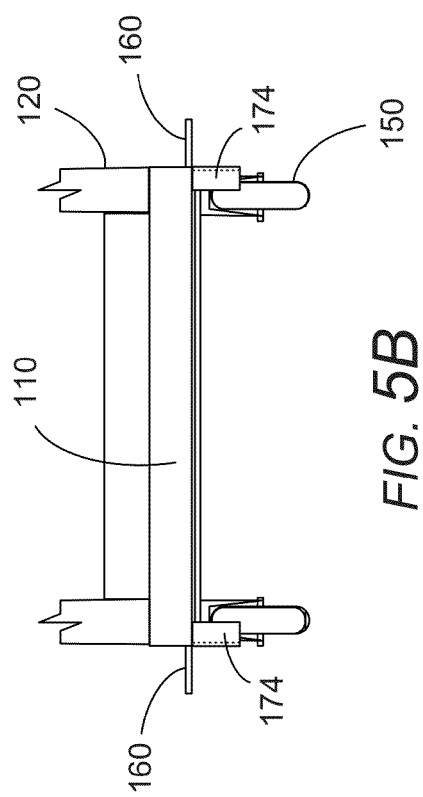

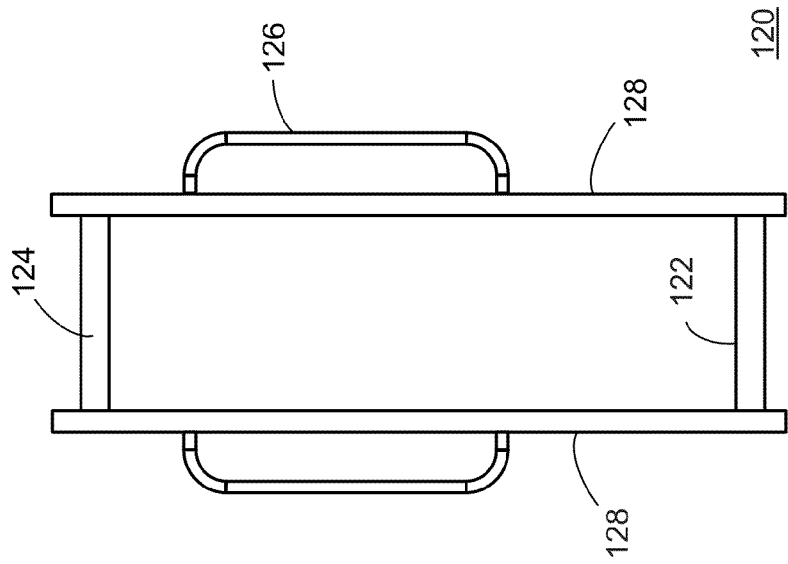
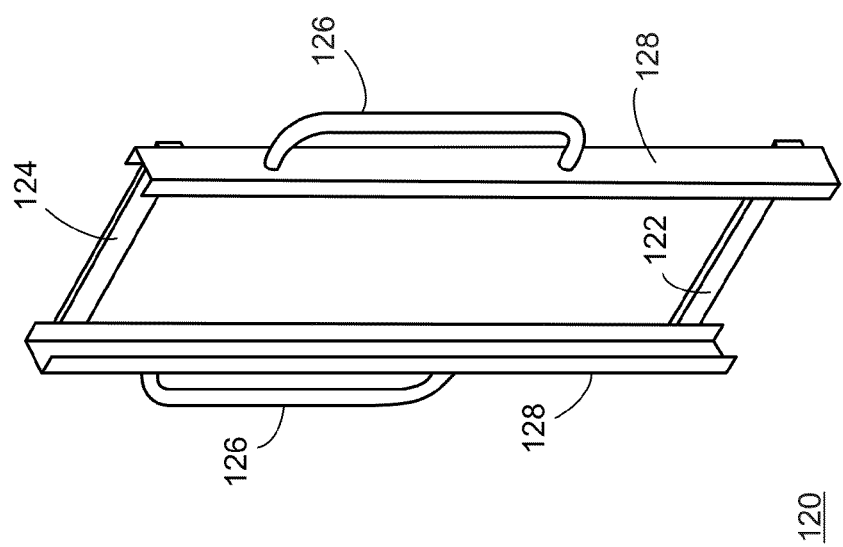
FIG. 6B
FIG. 6A

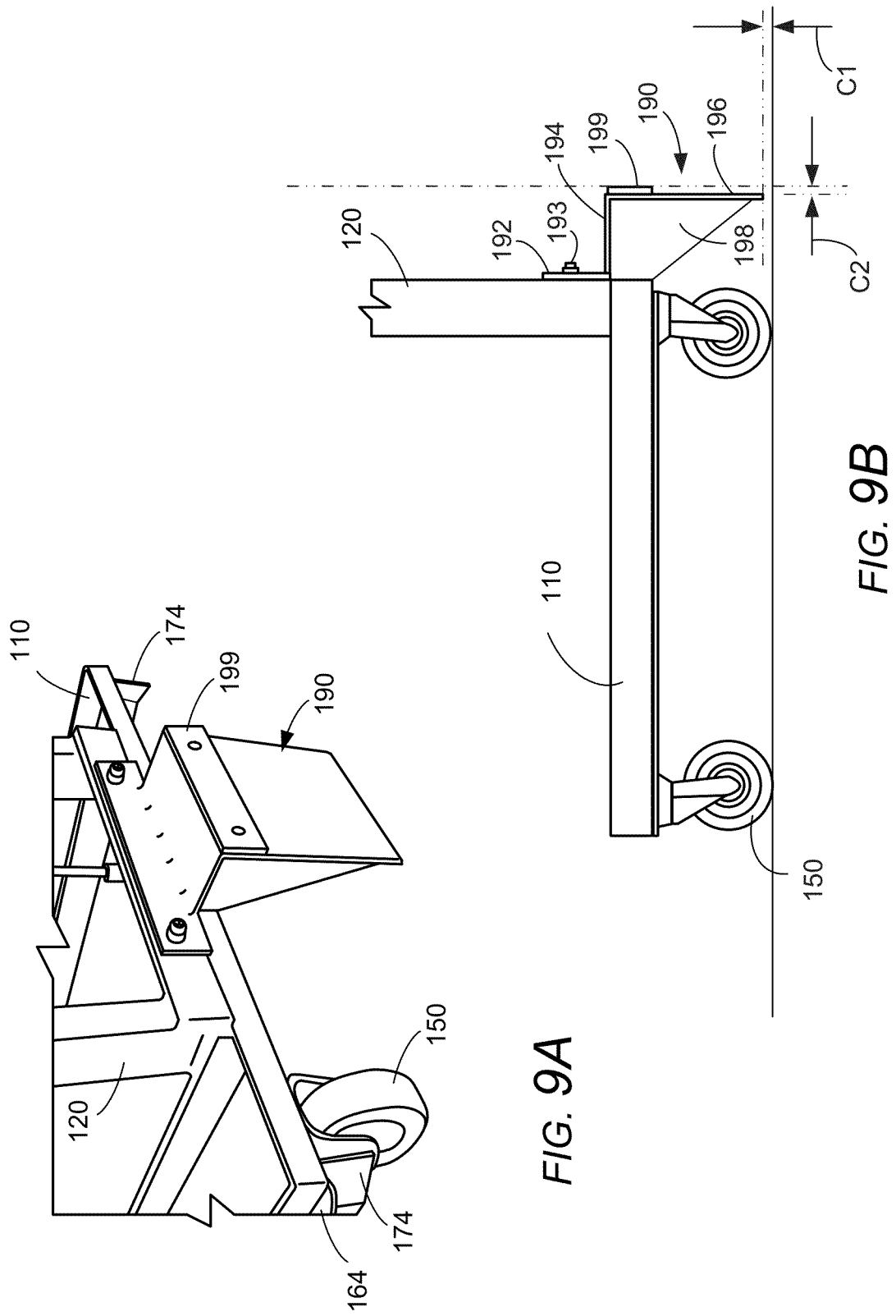

SELF-ELEVATING AND SELF-LOWERING ASSEMBLY CART FOR TRANSPORTING A HOUSEHOLD APPLIANCE ASSEMBLY COMPONENT

FIELD OF THE INVENTION

The present invention is directed to a self-positioning assembly cart for a household appliance assembly component, and more particularly, an unpowered self-elevating and self-lowering assembly cart for a household appliance assembly component, such as a household appliance door, that automatically adjusts a loading height and an unloading height for each assembly component to within a predetermined acceptable ergonomic work zone.

BACKGROUND OF THE INVENTION

Conventional oven door assembly carts may carry seven or eight oven doors, each of which may weigh approximately 30-40 lbs. The lowest door supported by the conventional oven door assembly carts commonly is low to the floor (e.g., less than 30 inches from the floor), while the highest part commonly is supported high above the floor (e.g., greater than 60 inches above the floor). Thus, an operator of the cart commonly may need to load the 30-40 lb doors onto the cart, or unload the 30-40 lb doors from the cart, from a low position near the floor (e.g., less than 30 inches from the floor). Similarly, the operator of the cart commonly may need to load the 30-40 lb doors onto the cart, or unload the 30-40 lb doors from the cart, from a high position above the floor (e.g., greater than 60 inches from the floor). However, assembly workers commonly are not required to reach too high nor too low to remove a door from the cart due to ergonomic factors. As a result, many conventional assembly carts are designed or constrained such that an operator does not position a door on the cart at a position or height that is outside an acceptable vertical ergonomic working zone. Such design constraints ordinarily limit the number of doors that may be carried by each conventional cart. For example, a conventional cart commonly may be structurally capable of holding seven or eight doors stacked or positioned one above the other on the cart. However, due to the ergonomic design constraints mentioned above, many conventional carts may be designed or constrained such that the cart only is capable of supporting a lesser amount of doors (e.g., six doors) or such that an operator uses less than the total number of available door supporting positions/locations of the cart. Such a limitation of the number of doors carried by the cart below the actual structural capabilities of the cart may adversely impact the efficiency of the manufacturing process.

SUMMARY OF THE INVENTION

The present invention recognizes that an assembly cart for household appliance assembly components (e.g., household appliance doors, and more particularly, oven doors) that can maximize a number of assembly components that can be carried by the assembly cart and that can be configured such that an operator can load and/or unload each assembly component at a height that is within a predetermined acceptable ergonomic work zone may improve efficiency of the manufacturing process. Additionally, the present invention recognizes that an assembly cart for household appliance assembly components (e.g., oven doors) that can be adjusted to compensate for appliance assembly components having different weights such that the operator can load and/or unload each assembly component at a height that is within a predetermined acceptable ergonomic work zone may further improve efficiency of the manufacturing process, provide greater flexibility in the application or use of the assembly cart, reduce operational costs of the assembly cart, and/or increase a useful lifespan of the assembly cart, for example, since the cart may be adjusted for use with various models and designs of appliance assembly components (e.g., various models and designs of oven doors).

These problems and others of the conventional carts are addressed by the present invention, a first exemplary embodiment of which includes a self-elevating and self-lowering assembly cart for a household appliance assembly component that automatically adjusts a loading and unloading height for each assembly component to within a predetermined acceptable ergonomic work zone based on a loaded state of the cart. The assembly cart does not require a power source (e.g., electrical or air) to provide the features of self-elevating and self-lowering. The exemplary embodiments can provide an unpowered assembly cart for household appliance assembly components (e.g., oven doors) that can maximize a number of assembly components that can be carried by the assembly cart while simultaneously being configured such that an operator can load and/or unload each assembly component at a height that is within a predetermined acceptable ergonomic work zone, thereby improving efficiency of the manufacturing process. The present invention can provide an assembly cart for household appliance assembly components (e.g., oven doors) that can be configured for use with household appliance assembly components (e.g., oven doors) having a uniform weight or for use with household appliance assembly components (e.g., oven doors) having a range of weights without requiring adjustments or modifications. Additionally, the present invention can provide an adjustable assembly cart for household appliance assembly components (e.g., oven doors) that is capable of being adjusted to compensate for appliance assembly components having different weights outside of the original range of weights. In this way, the present invention can provide greater flexibility in the application or use of the assembly cart, reduce operational costs of the assembly cart, and/or increase a useful lifespan of the assembly cart, for example, by enabling the cart may be used, or adjusted for use, with a variety of existing and new models and designs of household appliance assembly components (e.g., a variety of existing and new models and designs of oven doors).

The exemplary embodiments will be described with reference to an assembly cart for household appliance doors, and more particularly, with reference to an assembly cart for oven doors of a household appliance. One of ordinary skill in the art will recognize that the assembly cart according to the invention is not limited to an assembly cart for household appliance doors or oven doors, and can include an assembly cart for other household appliance assembly components such as, for example, other cooking appliance assembly components such as cooktops or cooktop assemblies, microwave oven doors, etc., dishwasher assembly components such as dishwasher doors, etc., exhaust fan assembly components, refrigerator assembly components such as refrigerator and freezer doors, etc., as well as other household appliance assembly components.

An exemplary embodiment of a self-elevating and self-lowering oven door assembly cart can include a plurality of appliance door support locations. In operation, the self-elevating and self-lowering oven door assembly cart can be configured such that one or more appliance door support locations are disposed within the predetermined acceptable ergonomic work zone when the assembly cart is in an unloaded state. One or more doors can be loaded respectively onto an unoccupied support position of the assembly cart that is disposed within the acceptable vertical ergonomic work zone. After a predetermined number of appliance doors are loaded onto the cart, and a predetermined weight threshold is reached, the self-elevating and self-lowering oven door assembly cart can automatically self-lower each appliance door support location upon which a door is disposed by an operator such that each successive available (unoccupied) appliance door support location (above the uppermost occupied support location) is moved into position within the acceptable vertical ergonomic work zone for loading an additional appliance door onto the assembly cart. In this way, the operator can load each door onto the cart within the acceptable vertical ergonomic work zone and the operator does not need to lift or lower a door outside of the acceptable ergonomic work zone.

For example, in a loading operation, a first door can be loaded onto an unoccupied support position of the assembly cart within the acceptable vertical ergonomic work zone. After a predetermined number of doors (e.g., three (3) doors) are loaded onto the assembly cart, and a predetermined weight threshold is reached, the weight of the doors (e.g., three (3) doors) on the cart can cause the cart to automatically lower the support positions such that the doors move downward and the next unoccupied support position above the uppermost occupied support position is moved within the acceptable vertical ergonomic work zone. The assembly cart does not require a power source (e.g., electrical or air) to provide the features of automatically self-lowering. An additional door (in this example, a fourth door) can be loaded onto the new lowermost unoccupied support position of the assembly cart, which is above the third door and is now within the acceptable vertical ergonomic work zone. As the fourth door is loaded, the weight of the first, second, third, and fourth doors on the cart can cause the cart to automatically lower the support positions again such that the doors move downward and the next unoccupied support position above the occupied support position (in this example, above the fourth door) is moved within the acceptable vertical ergonomic work zone. The loading operation can be repeated for additional doors until all available support positions of the assembly cart are loaded with doors. The assembly cart can be configured such that each support position is automatically positioned within the acceptable vertical ergonomic work zone as an operator loads each door into each respective support position. In this manner, an operator does not need to load any of the doors onto any of the support position of the cart at a height that is above or below the acceptable vertical ergonomic work zone.

In the example embodiment, the assembly cart can be configured such that a total of three (3) doors or the sum of the weights of three (3) doors can trigger the automatic self-lowering of the support positions of the assembly cart. One of ordinary skill in the art will recognize that the assembly cart can be configured for different thresholds, such as for a different threshold number of doors and/or a different threshold for the total weight of the doors loaded onto the assembly cart. For example, the assembly cart can be configured such that a single door or the weights of a single door can trigger the automatic self-lowering of the support positions of the assembly cart. In other examples, the assembly cart can be configured such that two (2) doors, four (4) doors, etc., or the sum of the weights of two (2) doors, four (4) doors, etc., can trigger the automatic self-lowering of the support positions of the assembly cart. An exemplary embodiment of the assembly cart also can be provided with an adjustable feature that permits adjustment of the threshold required to trigger the automatic self-lowering of the support positions of the assembly cart.

During an unloading operation, the exemplary embodiments of a self-elevating and self-lowering oven door assembly cart can self-elevate each uppermost door remaining on the cart to within an acceptable vertical ergonomic work zone as each successive door is removed from the cart. The assembly cart does not require a power source (e.g., electrical or air) to provide the features of self-elevating. For example, a first door can be unloaded from an uppermost support position of the assembly cart (e.g., from a top of the assembly cart), which is disposed within the acceptable vertical ergonomic work zone. As the first door is unloaded, the reduced weight of the remaining doors on the cart can cause the assembly cart to automatically self-elevate the remaining doors. In this manner, the support position of the next uppermost door (i.e., second door) (which may have been previously below the acceptable vertical working zone) can be automatically lifted by the cart into the acceptable vertical working zone for unloading by an operator. Next, the second door can be unloaded by the operator and the reduced weight of the remaining doors on the cart can cause the cart to automatically elevate the remaining doors. In this manner, the support position of the next uppermost door (i.e., third door) (which may have been previously below the acceptable vertical working zone) can be lifted by the cart into the acceptable vertical working zone for unloading by an operator. The unloading operation can be repeated for each additional door supported by the cart until all of the support positions of the assembly cart are unloaded. The assembly cart can be configured such that each support position is automatically positioned within the acceptable vertical ergonomic work zone as an operator unloads each door from each respective support position. In this manner, an operator does not need to unload any of the doors from any of the support position of the cart at a height that is above or below the acceptable vertical ergonomic work zone.

The present invention recognizes that an ergonomic work zone commonly is, for example, approximately 30" to 60" above a surface of the floor, or more particularly, 26.5" to 58.75" above a surface of the floor. For example, an embodiment of the self-elevating assembly cart can provide an ergonomic work zone having, for example, a range extending from a minimum work zone position that is equal to or greater than 26.5" above the floor to a maximum work zone position that is equal to or less than 58.75" above the floor. For example, a lowermost (or bottom) support position of the cart can be ensured to be at a position that is equal to or greater than 26.5" inches above the floor during loading and unloading. An uppermost (or top) support position of the cart can be ensured to be at a position that is equal to or less than 58.75" inches above the floor during loading and unloading. In this manner, the self-elevating assembly cart can eliminate a need for an operator to use steps or auxiliary assistance products, or for an operator to lean or reach down below the acceptable ergonomic work zone.

The exemplary embodiments may provide a self-elevating assembly cart having, for example, eight (8) vertical product locations, each capable of holding a household appliance door (e.g., an oven door), for example, weighing approximately 40 pounds, and more particularly, a range of one or more appliance doors having a weight ranging from 32-38 pounds. One of ordinary skill in the art will recognize that the assembly cart can be configured to support other amounts of doors and/or to support other appliance doors having different weights or ranges of weights. The assembly cart can be configured for appliance doors having a different range of weights. An exemplary embodiment of the assembly cart can be provided with an adjustable feature that permits adjustment of the automatic self-leveling and self-lowering of the support positions of the assembly cart for a different ranges of door weights. For example, the exemplary self-elevating assembly cart can be adjustable via a change in tension of an automatic self-leveling and self-lowering device of the assembly cart such that the self-elevating assembly cart can be adjustable to compensate for appliance doors having different weights (mass).

The self-elevating and self-lowering assembly cart can include a plurality of support locations/positions (e.g., oven door support locations/positions). The rail system can be configured such that, when the assembly cart is in an unloaded state, the support positions are disposed in an upward or extended position (unloaded position), and when the cart is in a loaded or partially loaded state, the support positions automatically move downward to one of a plurality of loaded or partially loaded positions.

In an exemplary embodiment, the assembly cart can include a base for supporting the plurality of support positions. The assembly cart can include one or more masts (e.g., a pair of masts) coupled to and extending upward from the base. The masts can support a rail system in a movable manner such that the rail system is automatically self-elevating and self-lowering with respect to the masts based on a loaded and unloaded state of the assembly cart. The rail system does not require a power source (e.g., electrical or air) for self-elevating or self-lowering. The rail system can include a plurality of arms disposed at different support positions along a vertical height of the rail system for supporting a plurality of appliance doors (e.g., oven doors) at a plurality of different positions. Each of the arms can be formed, for example, from bar stock, tubes, or the like.

The assembly cart can include means for automatically self-positioning (e.g., self-elevating and self-lowering) the rail system with respect to the masts. For example, the means for automatically self-elevating and self-lowering can be configured such that each of the doors disposed on the arms can be automatically positioned within an acceptable vertical ergonomic working zone during a loading and unloading operation for the door. The rail system can be configured such that, when the assembly cart is unloaded, the rail system is disposed in an upward or extended position (unloaded position), and when the cart is loaded or partially loaded, the rail system automatically moves downward to one of a plurality of loaded or partially loaded positions.

For example, the means for automatically self-elevating and self-lowering can be configured such that the rail system automatically self-lowers each respective arm upon which a door is to be disposed by an operator such that each successive available (unoccupied) arm (above the uppermost occupied arm) is positioned within an acceptable vertical ergonomic work zone. In this way, the operator can load each door onto the cart within the acceptable vertical ergonomic work zone and the operator does not need to lift or lower a door outside of the acceptable ergonomic work zone. For example, in a loading operation, one or more doors can be loaded respectively onto an unoccupied support position of the assembly cart that is disposed within the acceptable vertical ergonomic work zone. After a predetermined number of appliance doors are loaded onto the cart, and a predetermined weight threshold is reached, the means for automatically self-elevating and self-lowering can automatically lower the rail system (without power assistance), which includes the arms, such that the doors move downward and the next unoccupied arm above the uppermost occupied arm is moved within the acceptable vertical ergonomic work zone. An additional door can be loaded onto the new lowermost unoccupied arm of the assembly cart, which is above the previously loaded doors and is now within the acceptable vertical ergonomic work zone. As the additional door is loaded, the means for automatically self-elevating and self-lowering can automatically lower (without power assistance) the rail system such that the previously loaded doors move downward and the next unoccupied arm above the occupied arms is moved within the acceptable vertical ergonomic work zone. The loading operation can be repeated for additional doors until all available arms of the assembly cart are loaded. The assembly cart can be configured such that each arm is automatically positioned within the acceptable vertical ergonomic work zone as an operator loads each door onto each respective arm. In this manner, an operator does not need to load any of the doors onto any of the arms of the cart at a height that is above or below the acceptable vertical ergonomic work zone.

Similarly, the means for automatically self-elevating and self-lowering can be configured such that the rail system automatically self-elevates (without power assistance) each uppermost door remaining on the cart to within an acceptable vertical ergonomic work zone as each successive door is removed from the cart. For example, a first door can be unloaded from an uppermost arm of the assembly cart (e.g., from a top of the assembly cart), which is disposed within the acceptable vertical ergonomic work zone. As the first door is unloaded, the means for automatically self-elevating and self-lowering can automatically elevate (without power assistance) the remaining doors. In this manner, the arm of the next uppermost door (i.e., second door) (which may have been previously below the acceptable vertical working zone) can be automatically lifted (without power assistance) by the cart into the acceptable vertical working zone for unloading by an operator. Next, the second door can be unloaded by the operator and the means for automatically self-elevating and self-lowering can automatically elevate (without power assistance) the remaining doors. In this manner, the arm of the next uppermost door (i.e., third door) (which may have been previously below the acceptable vertical working zone) can be automatically lifted (without power assistance) by the cart into the acceptable vertical working zone for unloading by an operator. The unloading operation can be repeated for each additional door supported by the cart until all of the arms of the assembly cart are unloaded. The assembly cart can be configured such that each arm is automatically positioned (without power assistance) within the acceptable vertical ergonomic work zone as an operator unloads each door from each respective arm. In this manner, an operator does not need to unload any of the doors from any of the arms of the cart at a height that is above or below the acceptable vertical ergonomic work zone.

An embodiment of the self-elevating assembly cart can provide an ergonomic work zone ranging, for example, from a minimum height that is greater than or equal to 30" above the floor to a maximum height that is less than or equal to 60" above the floor, and more particularly, from a minimum height that is greater than or equal to 26.5" above the floor to a maximum height that is less than or equal to 58.75" above the floor.

According to the exemplary embodiments, a power source is not required (e.g., electrical or air) for the assembly cart. In an embodiment, the means for automatically self-elevating and self-positioning can include one or more coil springs coupled at a first end to a mast of the assembly cart, or alternatively, to the base of the assembly cart. The one or more coil springs can be coupled at a second end to the rail assembly of the assembly cart, which includes the plurality of arms for supporting the appliance doors. Additionally or alternatively, the means for automatically self-elevating and self-positioning can include one or more gas cylinders or adjustable gas cylinders coupled at a first end to the mast of the assembly cart, or alternatively, to the base of the assembly cart. The one or more adjustable gas cylinders can be coupled at a second end to the rail assembly of the assembly cart, which includes the plurality of arms for supporting the appliance doors.

The means for automatically self-elevating and self-lowering can be adjustable to compensate for doors having differing weights. For example, the means for automatically self-elevating and self-positioning can be adjustable by changing a resistance or quantity, for example, of one or more adjustable gas cylinders. The means for automatically self-elevating and self-lowering can be adjustable by changing a tension, quantity, or k-value, for example, of one or more coil springs. The means for automatically self-elevating and self-lowering (without power assistance) can include a combination of coil springs, adjustable gas cylinders, etc. or only a single type of means for automatically self-elevating and self-positioning.

In an exemplary embodiment, the means for automatically self-elevating and self-lowering can include a centrally located adjustable gas cylinder and a coil spring disposed on each side of the adjustable gas cylinder. In another exemplary embodiment, the means for automatically self-elevating and self-lowering can include a centrally located adjustable gas cylinder and a pair of coil springs arranged in series and disposed on each side of the adjustable gas cylinder. The rail system can include a first mounting bracket for the adjustable gas cylinder and a second mounting bracket for the coil springs. In other embodiments, the rail system can include a single mounting bracket for the adjustable gas cylinder and the coil springs. In other embodiments, the adjustable gas cylinder and/or the coil springs can be coupled to other parts of the rail system including, for example, one or more arms of the rail system, one or more side rails of the rail system, etc. The adjustable gas cylinder and/or the coil springs can be disposed between a pair of side rails of the rail system or between the rail system and the mast, such as internally mounted between a rail of the rail system and a mast of the assembly cart.

The assembly cart can include means for moving the cart such as casters or wheels on the base to facilitate manual movement of the assembly cart by an operator. The casters can include fixed casters or rotating casters. In an embodiment, the base includes a pair of fixed casters and a pair of rotating casters to facilitate easy maneuvering of the cart. The assembly cart can be configured such that the sum of the weight of the assembly cart and the weight of the loaded appliances doors on the assembly cart is within a predetermined amount (e.g., 90%) of industry accepted guidelines/standards/objectives, for permitting a user to push/pull the assembly cart in a loaded state, such as the guidelines described in 'The Hazard Analysis Tool,' which is commonly referred to as the "Snook Tables" and which was developed at Liberty Mutual Insurance Company and described in Snook, S. H. and Ciriello, V. M., "The design of manual handling tasks: revised tables of maximum acceptable weights and forces", Ergonomics, 34, 9, ©1991.

The self-elevating assembly cart can include one or more foot brakes to prevent movement of the cart. In other embodiments, one or more casters can include a brake for preventing movement of the respective caster. In other embodiments, the assembly cart can include a hand-operated brake.

An exemplary embodiment of the self-elevating and self-lowering assembly cart can be configured to work in conjunction with a tow transport delivery system (e.g., tow transport "E"-Frame delivery system) to final assembly lines, as well as other delivery systems. For example, the base can include one or more transport means for transporting the assembly cart, such as one or more wings or transport supports extending from opposing sides of the base that are configured to engage a tow transport delivery system such that the tow transport delivery system can lift the assembly cart (and the doors supported thereon) off of the floor and transport the assembly cart (and the doors supported thereon). The transport supports can include, for example, horizontal flanges or plates extending outward from the opposing sides of the base. Each flange or plate can extend along at least a portion of a length of a side of the base extending, for example, from a front (leading end) of the base toward a rear (trailing end) of the base. More particularly, each flange or plate can extend along an entire length (or along substantially an entire length) of a side of the base, thereby improving stability when the assembly cart is engaged with the transport delivery system. An underside of the flange or plate serves as a bearing surface for engaging the transport delivery system and lifting the assembly cart off of the floor. The flanges or plates can include tapered or rounded leading (front) or trailing (rear) edges to reduce or minimize sharp corners that can interfere with an operator's use of the assembly cart.

An exemplary embodiment of the self-elevating and self-lowering assembly cart can include guide means for guiding the assembly cart into a desired location for transporting by a tow transport delivery system. For example, the assembly cart can include one or more guides extending from the base that assist with positioning the assembly cart with respect to the tow transport delivery system. For example, each guide can extend from a lower side of the base and be disposed outside of any casters and/or footbrakes on the base. Each guide can extend along at least a portion of a length of a side of the base extending, for example, from a front (leading end) of the base toward a rear (trailing end) of the base. More particularly, each guide can extend along an entire length (or along substantially an entire length) of a side of the base, thereby improving stability when the assembly cart is engaged with the transport delivery system. The pair of opposing guides also can cooperate with the transport delivery system to maintain or hold the assembly cart in a fixed side-to-side position (i.e., lateral position). In an embodiment, each guide can include an angled or curved portion at one or more of a leading (front) end or a trailing (rear) end of the guide to assist with guiding the lengthwise portions of each guide into engagement with the corresponding parts of the transport delivery system.

The assembly cart can include one or more handles for an operator to maneuver the assembly cart. The handles can be formed on the masts and/or extend from the base. The handles can extend away from opposing sides of the assembly cart or in a rearward direction.

In an exemplary embodiment, at least one of the rail system and the mast system can include a plurality of bearings, rollers, wheels, cams, or friction reducing materials for reducing friction between the rail system and the mast and providing a smooth movement of the rail system with respect to the mast. For example, in an embodiment the assembly cart can include a pair of masts (e.g., U-shaped masts) that guide each of a pair of side rails of the rail system (e.g., within the U-shaped masts). Each of the pair of side rails can include a plurality of rollers disposed between the side rail and the mast to permit the side rail to translate along a length of the mast. The mast can be configured to engage and securely hold the rollers in a position that permits vertical movement and prevents lateral movement of the rollers. In other embodiments, the assembly cart can include a single mast and/or rail. For example, a single rail can be guided by a pair of opposing masts, or alternatively, a pair of rails can be disposed on opposing sides of a single mast. In still other embodiments, the assembly cart can include three or more masts and/or rails.

In an exemplary embodiment, the rail system of the assembly cart can be configured such that each door can be supported by a pair of arms, for example, including a first arm extending from a first rail and a second arm extending from a second rail. The first arm of each pair of arms can include means for protecting the appliance door (e.g., oven door) from damage and/or for permitting the oven door to slide or glide onto the first arm, such as UHMW (ultra-high-molecular-weight polyethylene) or other suitable material. The means for protecting or sliding the door on the arms can surround all or a part of the first arm or be formed an upper supporting surface of the first arm, such as a coating, layer, strip, or plurality of pieces formed, for example, from UHMW or other suitable material. The means for protecting or sliding the door on the arms can be continuous along an entire length of the arm or formed on one or more portions of the arm.

In an embodiment, the second arm of each pair of arms can include gripping or holding means for gripping or holding the oven door in a secure position on the second arm (e.g., means for preventing movement of the oven door with respect to the second arm). The gripping or holding means can surround all or a part of second arm or be formed an upper supporting surface of the second arm, such as a coating, layer, strip, or plurality of pieces formed, for example, from a rubber material, vinyl material, textured material, or other suitable material. The gripping or holding means can be continuous along an entire length of the arm or formed on one or more portions of the arm.

The first and second arms can be disposed at the same height with respect to each other to support the door in a parallel position with respect to the floor. In other embodiments, each of the first arm and the second arm can include one or more of means for protecting the oven door and/or means for holding the oven door in position.

In an embodiment, the upper support surface of a first arm can include the means for permitting the oven door to slide or glide onto the first arm and the second arm can include the means for preventing movement of the oven door. A lower surface of the first arm and/or the second arm also can include means for protecting a door disposed under the first and/or second arm from damage, such as a layer of felt, rubber, vinyl, etc. In other embodiments, the arms can include an end bumper guard formed, for example, from rubber, foam, vinyl coated metal or flexible metal, or the like.

In yet another embodiment, a surface or edge of one or more of the masts also can include edge guard means for protecting the doors from damage. For example, a leading (front) surface or edge of each of the masts, which face the oven doors, can include a layer of felt, foam, rubber, or other suitable material. The edge guard means can be continuous along an entire length of the edge of the mast, formed on one or more portions of the mast, on areas of the mast between each arm, or be notched at or around each arm. In an example embodiment, the edge of the mast can include an edge guard formed, for example, from vinyl coated metal. The edge guard can have, for example, a U-shaped cross-section that engages the edge of the mast. An interior surface of the edge guard can include one or more protrusions for preventing the edge guard from disengaging from the edge of the mast.

In an embodiment, the self-elevating assembly cart can include anti-tip means or features, such as an anti-tip bumper or anti-tip device for preventing the cart from tipping over in a loaded, partially loaded, or unloaded state. The anti-tip device can include, for example, a base plate that is coupled to the base of the assembly cart and an anti-tip part (e.g., a flange, plate, bar, or the like) extending from the base plate toward a vicinity of the floor such that the anti-tip part contacts the floor and limits a range of movement of the assembly cart in an event that the assembly cart accidentally tips or tilts in a direction of the anti-tip device, for example, when the assembly cart is in an unloaded state, an operator pushes the assembly cart (particularly, when unloaded) in rearward directions, etc. The anti-tip part can extend to within a predetermined distance or clearance between a lower end of the anti-tip part and the floor, such as a ⅜" clearance. The anti-tip device can include a reinforcement support (e.g., a gusset) between the base plate and the anti-tip part to further strengthen the anti-tip device and prevent accidental tipping over of the assembly cart.

The anti-tip device can include a spacer or bumper formed on the anti-tip device to provide a stand-off between the assembly cart and other assembly carts, for example, when the assembly cart is stored with other assembly carts. For example, the anti-tip device can include a spacer or bumper coupled to a trailing surface (rear surface) of the anti-tip device, such as a rubber spacer or bumper, plastic spacer or bumper, or the like. The spacer or bumper can provide additional clearance between the doors loaded on the arms of the cart and surfaces or parts of adjacent carts. For example, if an operator does not load a door completely onto an arm and a portion of the door extends past the end of the arm, a part of the door may come into contact with a part of the mast, gas cylinder, springs, etc., of an adjacent second cart, for example, when the carts are aligned in series, or when the carts are stored or being transported together. The spacer or bumper can provide additional clearance to minimize or prevent contact between such a door loaded on the arms of a first cart and a part of the mast, gas cylinder, springs, etc., of an adjacent second cart or other object. The spacer or bumper also can minimize damage to the cart or other carts resulting from contact between the cart and another surface or cart.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIGS. 1A-1C are a front view, a rear view, and a side view, respectively, of a self-elevating oven door assembly cart, according to an exemplary embodiment of the invention, in an unloaded state.

FIGS. 2A-2C are a front view, a rear view, and a side view, respectively, of the self-elevating oven door assembly cart of FIGS. 1A-1C, according to an exemplary embodiment of the invention, in a partially loaded state.

FIGS. 3A-3C are a front view, a rear view, and a side view, respectively, of the self-elevating oven door assembly cart of FIGS. 1A-1C, according to an exemplary embodiment of the invention, in a fully loaded state.

FIGS. 5A and 5B are partial rear views and FIGS. 5C-5E are a bottom view, a bottom perspective view, and another bottom view, respectively, of a self-elevating oven door assembly cart, according to other exemplary embodiments of the invention.

FIGS. 6A and 6B are a front perspective view and a front view, respectively, of a mast assembly, according to an exemplary embodiment of the invention.

FIGS. 9A and 9B are a partial rear perspective view and a partial side view, respectively, of a self-elevating oven door assembly cart having an anti-tip device, according to an exemplary embodiment of the invention

DETAILED DESCRIPTION OF THE EXEMPLARY EMBODIMENTS OF THE INVENTION

Figure 4C:
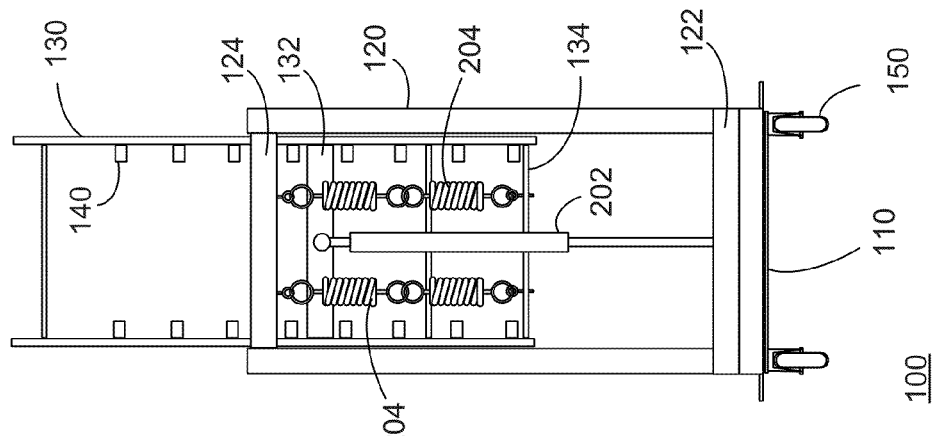
FIGS. 4A-4C are rear views of a self-elevating oven door assembly cart, according to exemplary embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The exemplary embodiments will be described with reference to an assembly cart for household appliance doors, and more particularly, with reference to an assembly cart for oven doors of a household appliance. One of ordinary skill in the art will recognize that the assembly cart according to the invention is not limited to an assembly cart for household appliance doors or oven doors, and can include an assembly cart for other household appliance assembly components such as, for example, other cooking appliance assembly components such as cooktops or cooktop assemblies, microwave oven doors, etc., dishwasher assembly components such as dishwasher doors, etc., exhaust fan assembly components, refrigerator assembly components such as refrigerator and freezer doors, etc., as well as other household appliance assembly components.

Referring now to FIGS. 1A-9B, exemplary embodiments of a self-elevating oven door assembly cart will now be described.

With reference to FIGS. 1A-1C, an exemplary embodiment of a self-elevating oven door assembly cart 100 can include a base 110 having means for supporting a plurality of appliance doors (not shown in FIGS. 1A-1C). The assembly cart 100 can include one or more masts 120, such as a pair of masts, coupled to and extending upward from the base 110. The masts 120 can support a rail system 130 in a movable manner such that the rail system 130 is self-elevating and self-lowering with respect to the masts 120 based on a loaded and unloaded state of the assembly cart 100. The rail system 120 can include a plurality of arms 140 disposed at different support positions along a vertical height of the rail system 130 for supporting a plurality of appliance doors (not shown in FIGS. 1A-1C) at a plurality of different positions. Each of the arms 140 can be formed, for example, from bar stock, tubes, or the like. The assembly cart 100 can include means for moving the cart such as casters or wheels 150 on the base to facilitate manual movement of the assembly cart 100 by an operator. The casters 150 can include fixed casters or rotating casters. In an embodiment, the base 110 includes a pair of fixed casters and a pair of rotating casters to facilitate easy maneuvering of the cart.

The assembly cart 100 can include means for automatically self-positioning (e.g., means for automatically self-elevating and self-lowering; not shown in FIGS. 1A-1C) the arms 140 or rail system 130 with respect to the masts 120. For example, the means for automatically self-elevating and self-lowering can be configured such that each of the arms 140 can be automatically positioned within an acceptable vertical ergonomic working zone (e.g., between WZmin and WZmax) during a loading and unloading operation for each arm 140. As shown in FIGS. 1A-1C, the rail system 130 can be configured such that, when the assembly cart 100 is unloaded, the rail system 130 is disposed (e.g., biased) in an upward or extended position (unloaded position) with respect to the mast 120.

With reference to FIGS. 2A-2C, the rail system 130 can be configured to automatically self-position (e.g., automatically self-elevate and self-lower) such that each available (unoccupied) arm 140 upon which a door is to be disposed by an operator is positioned within the acceptable vertical ergonomic work zone between WZmin and WZmax. In operation, the operator can load each door 900 onto a respective pair of arms 140 of the cart 100 within the acceptable vertical ergonomic work zone and the operator does not need to lift or lower a door outside of the acceptable ergonomic work zone between WZmin and WZmax.

For example, as shown in the example illustrated in FIGS. 1A-1C, the self-elevating and self-lowering oven door assembly cart 100 can be configured such that one or more appliance door support locations (e.g., arms 140) are disposed within the predetermined acceptable ergonomic between WZmin and WZmax when the assembly cart is in an unloaded state. In a loading operation, one or more doors 900 can be loaded onto the lowermost unoccupied arms 140 of the assembly cart within the acceptable vertical ergonomic work zone between WZmin and WZmax. As shown in FIGS. 2A-2C, after a predetermined number of appliance doors 900 (in this example, three (3) appliance doors) are loaded onto the arms 140, and a predetermined weight threshold is reached, the rail system 130 having the arms 140 can automatically self-lower (without power assistance) such that the doors 900 move downward and the next unoccupied arm 140 above the uppermost occupied arm 140 is moved within the acceptable vertical ergonomic work zone between WZmin and WZmax. The assembly cart 100 does not require a power source (e.g., electrical or air) to provide the features of automatically self-lowering. An additional door 900 (in this example, a fourth door) can be loaded onto the new lowermost unoccupied arm 140 of the assembly cart 100, which is above the first door 900 and is now within the acceptable vertical ergonomic work zone. As the additional door 900 is loaded, the rail system 130 can automatically self-lower (without power assistance) such that the doors 900 move downward and the next unoccupied arm 140 above the occupied arms is within the acceptable vertical ergonomic work zone between WZmin and WZmax.

With reference to FIGS. 3A-3C, the loading operation can be repeated for additional doors 900 until all available arms 140 of the assembly cart 100 are loaded. As shown in FIGS.

3A-3C, each arm 140 can be automatically positioned within the acceptable vertical ergonomic work zone between WZmin and WZmax as an operator loads each door 900 onto each respective arm 140. In this manner, an operator does not need to load any of the doors onto any of the arms of the cart at a height that is above or below the acceptable vertical ergonomic work zone.

In the example embodiment illustrated in FIGS. 1A-3C, the assembly cart 100 can be configured such that a total of three (3) doors 900 or the sum of the weights of three (3) doors can trigger the automatic self-lowering of the support positions (e.g., arms 140) of the assembly cart 100 without power assistance. One of ordinary skill in the art will recognize that the assembly cart 100 can be configured for different thresholds, such as for a different threshold number of doors 900 and/or a different threshold for the total weight of the doors loaded onto the assembly cart 100. For example, the assembly cart 100 can be configured such that a single door 900 or the weights of a single door can trigger the automatic self-lowering of the support positions (e.g., arms 140) of the assembly cart 100 without power assistance. In other examples, the assembly cart 100 can be configured such that two (2) doors, four (4) doors 900, etc., or the sum of the weights of two (2) doors, four (4) doors, etc., can trigger the automatic self-lowering of the support positions of the assembly cart 100 without power assistance. An exemplary embodiment of the assembly cart 100, which will be described in greater detail below, also can be provided with an adjustable feature that permits adjustment of the threshold required to trigger the automatic self-lowering of the support positions of the assembly cart 100 without power assistance.

With reference again to FIGS. 1A-3C in reverse order, the rail system 130 can automatically self-elevate (without power assistance) each uppermost door 900 remaining on the cart 100 to within the acceptable vertical ergonomic work zone between WZmin and WZmax as each successive door 900 is removed (unloaded) from the cart 100. For example, a first door 900 can be unloaded from an uppermost arm of the assembly cart (e.g., from a top of the assembly cart), which is disposed within the acceptable vertical ergonomic work zone as shown in FIGS. 3A-3C. As each successive door 900 is unloaded, the rail system 130 can automatically self-elevate (without power assistance) the arms 140 and the remaining doors 900. In this manner, the arms 140 shown in FIGS. 3A-3C that previously were disposed below the acceptable vertical working zone (i.e., below WZmin) can be automatically lifted into the acceptable vertical working zone (without power assistance) for unloading by an operator, as shown in the partially loaded/partially unloaded state in FIGS. 2A-2C. When all of the doors 900 are removed (unloaded) from the arms 140, the rail system 130 can automatically return (without power assistance) to the unloaded state shown in FIGS. 1A-1C, in which the lowermost arm 140 is within the acceptable vertical ergonomic work zone between WZmin and WZmax for re-loading with another set of doors.

An embodiment of the self-elevating assembly cart can provide an ergonomic work zone ranging, for example, from a minimum height that is greater than or equal to 30" above the floor to a maximum height that is less than or equal to 60" above the floor, and more particularly, from a minimum height that is greater than or equal to 26.5" above the floor to a maximum height that is less than or equal to 58.75" above the floor. One of ordinary skill will recognize that other work zones are contemplated within the spirit and scope of the invention.

Figure 4B:
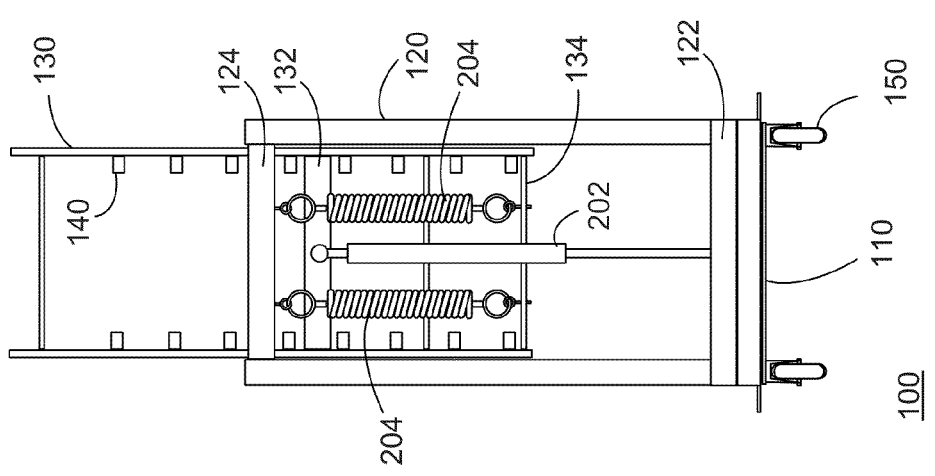
Figure 4A:
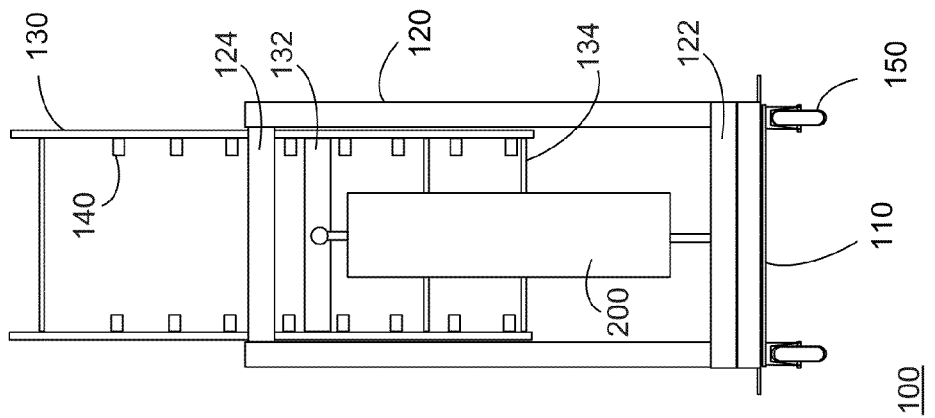

With reference to FIGS. 4A-4C, the assembly cart can include one or more means for automatically self-elevating and self-positioning (e.g., 200, 202, 204).

As shown in FIG. 4A, the means for automatically self-elevating and self-positioning can include one or more suitable devices 200 for automatically self-elevating and self-lowering the rail system 130 with respect to the mast 120.

For example, as illustrated in FIG. 4B, the means for automatically self-elevating and self-lowering can include one or more coil springs 204 coupled at a first end to a mounting plate 124 of the mast 120 of the assembly cart 100. The one or more coil springs 204 can be coupled at a second end to a mounting plate 134 of the rail assembly 130 of the assembly cart 100, which includes the plurality of arms 140 for supporting the appliance doors. Additionally or alternatively, the means for automatically self-elevating and self-lowering can include one or more gas cylinders (or adjustable gas cylinders) 202 coupled at a first end to a mounting plate 122 of the mast 120 of the assembly cart 100, or alternatively, to the base 110 of the assembly cart 100. The one or more gas cylinders (or adjustable gas cylinders) 202 can be coupled at a second end to a mounting plate 132 of the rail assembly 130 of the assembly cart 100, which includes the plurality of arms 140 for supporting the appliance doors. As shown in FIG. 4B, the gas cylinder (or adjustable gas cylinder) 202 can be centrally location between coil springs 204, which are disposed on each side of the gas cylinder 202.

In another exemplary embodiment shown in FIG. 4C, a gas cylinder (or adjustable gas cylinder) 202 can be disposed between a pair of coil springs 204 arranged in series and disposed on each side of the adjustable gas cylinder 202.

In other embodiments, the rail system 130 can include a single mounting bracket (not shown) for the gas cylinder 202 and the coil springs 204. In other embodiments, the gas cylinder 202 and/or the coil springs 204 can be coupled to other parts of the rail system 130 (not shown) including, for example, one or more arms 140 of the rail system 130, one or more side rails of the rail system 130, etc. The gas cylinder 202 and/or the coil springs 204 can be disposed between a pair of side rails of the rail system 130 or between the rail system 130 and the mast 120, such as internally mounted between a rail of the rail system 130 and a mast 120 of the assembly cart 100 (not shown).

The means for automatically self-elevating and self-lowering can be adjustable to compensate for doors having differing weights (mass). For example, the means for automatically self-elevating and self-positioning can be adjustable by changing a resistance or quantity, for example, of one or more adjustable gas cylinders 202. The means for automatically self-elevating and self-lowering can be adjustable by changing a tension, k-value, or quantity, for example, of one or more coil springs 204. The means for automatically self-elevating and self-lowering can include a combination of coil springs 204, adjustable gas cylinders 202, or the like, or only a single type of means for automatically self-elevating and self-positioning.

Figure 5D:
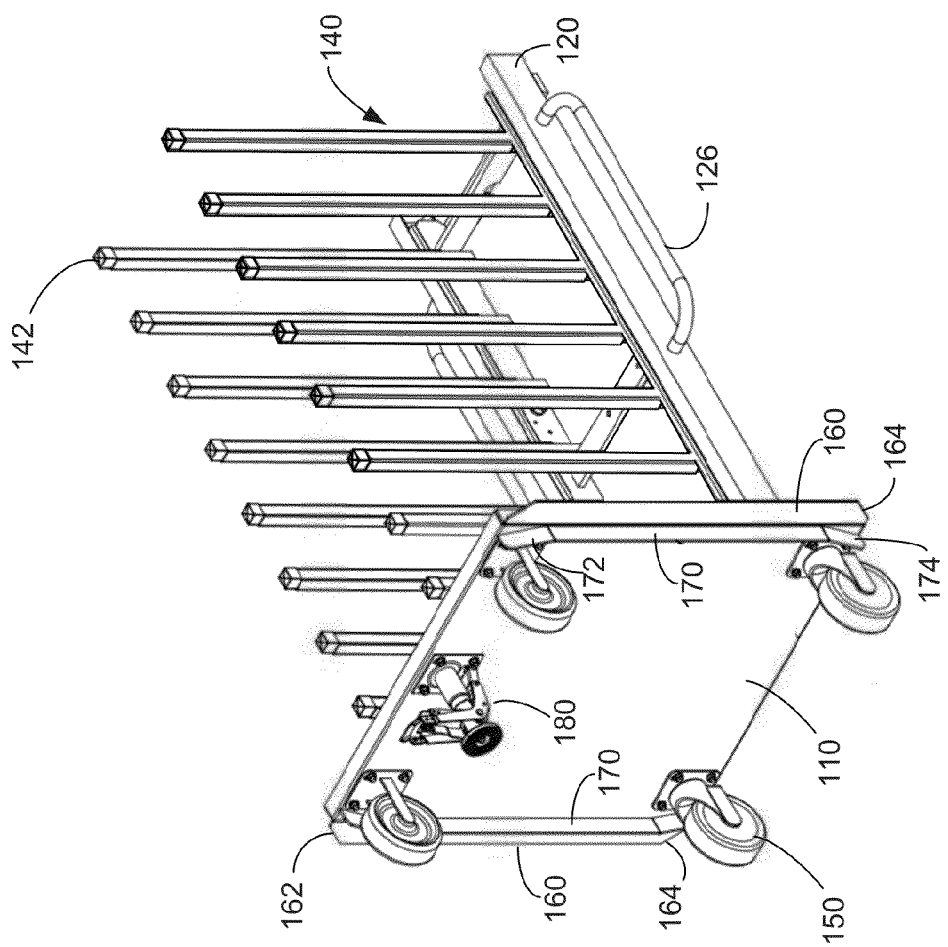

With reference to FIGS. 5A-5E, an exemplary embodiment of the self-elevating and self-lowering assembly cart 100 can be configured to work in conjunction with a tow transport delivery system (e.g., tow transport "E"-Frame delivery system; not shown) to final assembly lines, as well as other delivery systems. For example, as shown in FIGS. 5A and 5B, the base 100 can include transport means (e.g., 160, 162, 164) for transporting the assembly cart, such as one or more wings or transport supports 160 extending from opposing sides of the base that are configured to engage a tow transport delivery system such that the tow transport delivery system can lift the assembly cart (and the doors supported thereon) off of the floor and transport the assembly cart (and the doors supported thereon). The transport supports 160 can include horizontal flanges or plates extending outward from the opposing sides of the base 110.

Figure 5E:
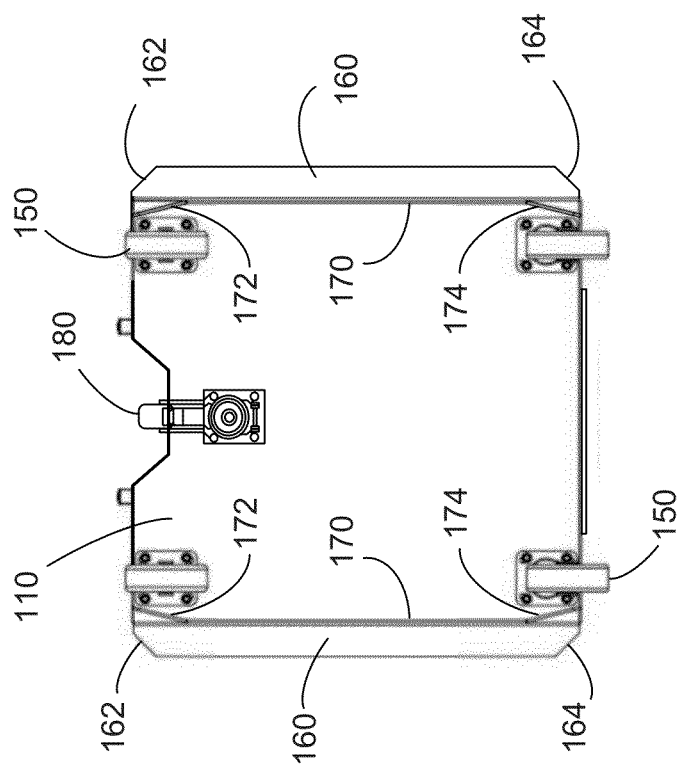

As shown in FIGS. 5C-5E, each transport support 160 (flange or plate) can extend along at least a portion of a length of a side of the base 110 extending, for example, from a front (leading end) of the base toward a rear (trailing end) of the base 110. More particularly, each transport support 160 can extend along an entire length (or along substantially an entire length) of a side of the base 110, thereby improving stability when the assembly cart 100 is engaged with the transport delivery system. An underside of the transport support 160 serves as a bearing surface for engaging the transport delivery system and lifting the assembly cart 100 off of the floor. The transport support 160 can include a tapered or rounded leading (front) edge 162 or a tapered or rounded trailing (rear) edge 164 to reduce or minimize sharp corners that can interfere with an operator's use of the assembly cart.

With reference again to FIGS. 5B-5E, an exemplary embodiment of the self-elevating and self-lowering assembly cart 100 can include guide means (e.g., 170, 172, 174) for guiding the assembly cart 100 into a desired location for transporting by a tow transport delivery system. For example, the assembly cart 100 can include one or more guides 170 extending from the base 110 that assist with positioning the assembly cart with respect to the tow transport delivery system. Each guide 170 can extend from a lower side of the base 110 and be disposed outside of any casters 150 and/or footbrakes 180 on the base 110, as shown in FIGS. 5C-5E. Each guide 170 can extend along at least a portion of a length of a side of the base 110 extending, for example, from a front of the base 110 toward a rear of the base 100. More particularly, each guide 170 can extend along an entire length (or along substantially an entire length) of a side of the base 110, thereby improving stability when the assembly cart is engaged with the transport delivery system. The pair of opposing guides 170 also can cooperate with the transport delivery system to maintain or hold the assembly cart in a fixed side-to-side position (i.e., lateral position). In an embodiment, each guide 170 can include an angled or curved portion at one or more of a leading (front) end 172 or a trailing (rear) end 174 of the guide 170 to assist with guiding the lengthwise portions of each guide 170 (i.e., the portion between the ends 172 and 174) into engagement with the corresponding parts of the transport delivery system.

With reference again to FIGS. 5C and 5D, the assembly cart can include means for moving the cart such as casters or wheels 150 on the base to facilitate manual movement of the assembly cart 100 by an operator. The casters can include fixed casters or rotating casters 150. In an embodiment, the base 100 includes a pair of fixed casters and a pair of rotating casters to facilitate easy maneuvering of the cart 100. The self-elevating assembly cart can include one or more foot brakes 180 to prevent movement of the cart. In other embodiments, one or more casters 150 can include a brake for preventing movement of the respective caster 150. In other embodiments, the assembly cart can include a hand-operated brake (not shown). As shown in FIGS. 5C and 5D, a foot brake 180 can be coupled to an underside of the base 110 such that a part of the foot brake 180 extends or protrudes outward from the base 110 to provide an operator with access to the foot brake 180. In another example embodiment, such as the example illustrated in FIG. 5E, the base 110 can include a recess or cutout for providing access to the foot brake 180, which can be coupled to the underside of the base 110 without extending or protruding beyond an outermost perimeter of the sides of the base 110, thereby providing an operator with access to the foot brake 180 while reducing the overall footprint of the assembly cart 100 and possible interference with the foot brake 180 with other objects or other carts.

With reference to FIGS. 6A and 6B, an exemplary mast 120 will now be described. In an embodiment, the exemplary mast 120 can include a pair of masts 128 (e.g., U-shaped masts) that guide each of a pair of side rails (not shown in FIGS. 6A and 6B) of the rail system (e.g., within the U-shaped masts). The exemplary mast 120 can include support or mounting plates 122 and 124 for strengthening the mast 120 and fixing the spacing between the pair of mast 128 and/or providing mounting locations for one or more means for automatically self-leveling and self-lowering.

With reference to again FIGS. 5D, 6A, and 6B, the mast 120 can include one or more handles 126 for an operator to maneuver the assembly cart 100. The handles 126 can be formed on the masts 120. The handles 206 can extend away from opposing sides of the assembly cart 100 or in a rearward direction. In other embodiments, the handles can extend from the base 110.

Figure 7A:
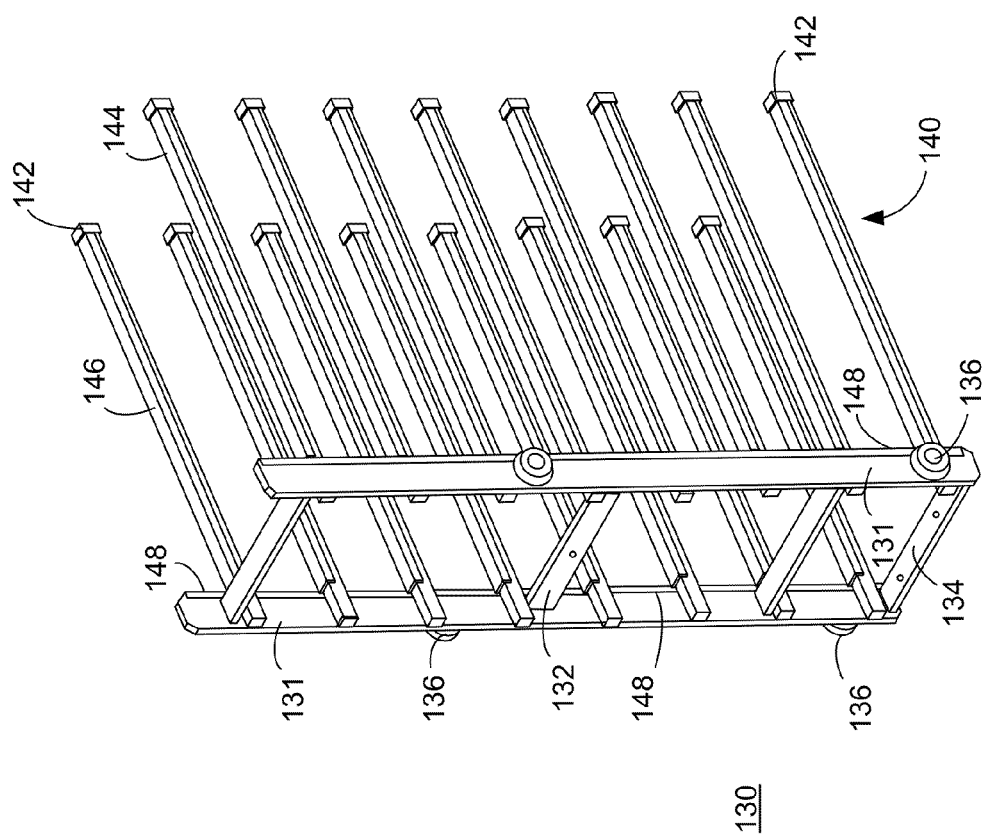
FIGS. 7A and 7B are a rear perspective view and a partial front perspective view, respectively, of a rail assembly, according to an exemplary embodiment of the invention.
Figure 7B:
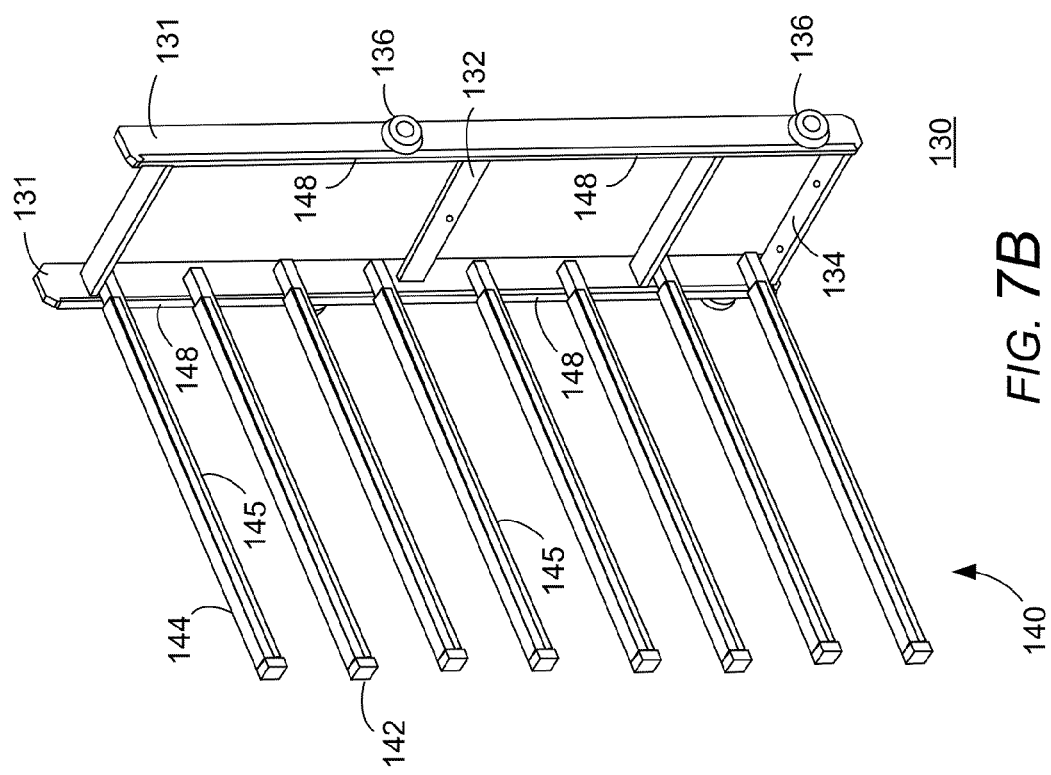

With reference to FIGS. 7A and 7B, an exemplary rail system 130 will now be described.

In an exemplary embodiment, the rail system 130 can include a plurality of rollers 136 (or, e.g., bearings, wheels, cams, or other friction reducing materials) for reducing friction between the rail system 130 and the mast (shown in FIGS. 6A and 6B) and providing a smooth movement of the rail system 130 with respect to the mast. For example, in an embodiment, each of a pair of side rails 131 of the rail system 130 can include a plurality of rollers 136 disposed between the side rail 131 and the mast (120 shown in FIGS. 5D, 6A, and 6B) to permit the side rail 130 to translate along a length of the mast. One of ordinary skill in the art will recognize that the mast (120 shown in FIGS. 5D, 6A, and 6B) can be configured to engage and securely hold the rollers 136 in a position that permits vertical movement and prevents lateral movement of the rollers 136.

In other embodiments, the assembly cart 100 can include a single mast and/or rail (not shown). For example, a single rail can be guided by a pair of opposing masts, or alternatively, a pair of rails can be disposed on opposing sides of a single mast (not shown). In still other embodiments, the assembly cart can include three or more masts and/or rails (not shown).

With reference again to FIGS. 2A, 2B, 3A, and 3B, the rail system 130 of the assembly cart 100 can be configured such that each door 900 can be supported by a pair of arms 140, for example, including a first arm extending from a first rail and a second arm extending from a second rail (see also FIGS. 7A and 7B).

With reference to FIGS. 7A and 7B, the arms 140 can include an end bumper guard 142 formed, for example, from rubber, foam, vinyl coated metal or flexible metal, or the like. A first arm of each pair of arms 140 can include means for protecting the appliance door (e.g., oven door) from damage and/or for permitting the oven door to slide or glide (e.g., 144) onto the first arm, such as UHMW (ultra-high-molecular-weight polyethylene) or other suitable material. The means for protecting or sliding (e.g., 144) the door on the arms 140 can surround all or a part of first arm or be formed an upper supporting surface of the first arm, such as a coating, layer, strip, or plurality of pieces 144 formed, for example, from UHMW or other suitable material. The means for protecting or sliding (e.g., 144) the door on the arms can be continuous along an entire length of the arm 140 or formed on one or more portions of the arm 140.

With reference again to FIGS. 7A and 7B, a second arm of each pair of arms 140 can include gripping or holding means (e.g., 146) for gripping or holding the oven door in a secure position on the second arm (e.g., means for preventing movement of the oven door with respect to the second arm). The gripping or holding means (e.g., 146) can surround all or a part of second arm or be formed an upper supporting surface of the second arm, such as a coating, layer, strip, or plurality of pieces 146 formed, for example, from a rubber material, textured material, or other suitable material. The gripping or holding means (e.g., 146) can be continuous along an entire length of the arm 140 or formed on one or more portions of the arm 140.

The first and second arms 140 can be disposed at the same height with respect to each other to support the door in a parallel position with respect to the floor. In other embodiments, each of the first arm and the second arm can include one or more of means for protecting and sliding (e.g., 144) the oven door on the arm 140 and/or gripping means for holding (e.g., 146) the oven door in position on the arm 140. In the illustrated embodiment shown in FIGS. 7A and 7B, the upper support surface of a first arm can include the means for permitting the oven door to slide or glide (e.g., 144) onto the first arm and the second arm can include the gripping means for preventing movement (e.g., 146) of the oven door. In operation, an operator can place a part of an oven door on the first arm having the means for permitting the oven door to slide or glide (e.g., 144). The door can then be moved (slid) over the surface 144 until the door is above the second arm having the gripping means (e.g., 146) (or at least contacts the second arm) and then lowered onto the surface 146. The gripping means (e.g., 146) can prevent the door from sliding after the door is loaded on the pair of arms 140.

With reference to FIGS. 7A and 7B, in yet another embodiment, a surface or edge of one or more of the masts 120 also can include edge guard means (e.g., 148) for protecting the doors from damage. For example, a leading (front) surface or edge of each of the masts 120, which face the oven doors, can include a layer of felt, foam, rubber, or other suitable material 148. The edge guard means (e.g., 148) can be continuous along an entire length of the edge of the mast 120, formed on one or more portions of the mast 120, on areas of the mast 120 between each arm 140, or be notched at or around each arm 140. In an example embodiment, the edge of the mast 120 can include an edge guard 148 formed, for example, from vinyl coated metal, which is described in greater detail with reference to FIG. 8C.

Figure 8A:
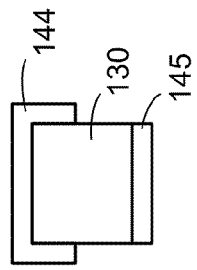
FIGS. 8A and 8B are end views of an arm of the rail assembly of FIGS. 7A and 7B, according to exemplary embodiments of the invention.
Figure 8B:
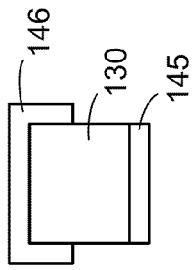

FIG. 8A illustrates an exemplary embodiment of an arm 140 having the means for permitting the oven door to slide or glide (e.g., 144). FIG. 8B illustrates an exemplary embodiment of an arm 140 having the gripping means (e.g., 146) on an upper surface of the arm 140. As shown in FIGS. 8A and 8B, the means 144 or 146 can wrap around or cover the upper surface of the arm 140 and at least a portion of one or more edges or side surfaces of the arm 140. In other embodiments, the means 144 or 146 can be formed only on the upper surface of the arm 140 or the means 144 or 146 can completely surround the arm.

With reference again to FIGS. 8A and 8B, a lower surface of the first arm and/or the second arm 140 also can include means (e.g., 145) for protecting a door, which is disposed on, or being loaded onto or unloaded off of, another arm that is under the first arm and/or second arm, from damage. The means (e.g., 145) for protecting the door can include, for example, a layer of felt, rubber, vinyl, etc.

Figure 8C:
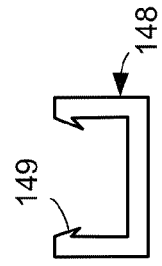
FIG. 8C is a top view of an edge protector of the rail assembly of FIGS. 7A and 7B, according to an exemplary embodiment of the invention.

With reference to FIG. 8C, the edge of the mast 120 can include an edge guard 148 formed, for example, from vinyl coated metal, having, for example, a U-shaped cross-section that engages the edge of the mast 120. An interior surface of the edge guard 148 can include one or more protrusions 149 for preventing the edge guard 148 from disengaging from the edge of the mast 120.

With reference to FIGS. 9A and 9B, in an embodiment, the self-elevating assembly cart 100 can include anti-tip means or features (e.g., 190, 192, 194, 196, 198), such as an anti-tip bumper or anti-tip device 190 for preventing the cart 100 from tipping over in a loaded, partially loaded, and particularly, in an unloaded state. The anti-tip device 190 can include, for example, a base plate 192 that is coupled to the base 110 of the assembly cart 100 using, for example, fasteners 193. The anti-tip device 190 can be removably secured to the base 110 or permanently coupled to the base 110, for example, by welding. The anti-tip device 190 can include an anti-tip part (e.g., a flange, plate, bar, or the like) extending from the base plate 192 toward a vicinity of the floor such that the anti-tip part contacts the floor and limits a range of movement of the assembly cart in an event that the assembly cart tips or tilts in a direction of the anti-tip device 190. The anti-tip part can include, for example, an L-shaped plate having a lateral portion 194 and a vertical portion 196. The anti-tip device 190 can extend to within a predetermined distance or clearance C1 between a lower end of the anti-tip device 190 (e.g., a lower end of the anti-tip part 196) and the floor, such as a ⅜" clearance C1 shown in FIG. 9B. The anti-tip device 190 can include a reinforcement support, such as a gusset 198, between the base plate 192 and the anti-tip part (e.g., 194, 196) to further strengthen the anti-tip device 190 and prevent accidental tipping or rolling over of the assembly cart 100, particularly when the assembly cart 100 is in an unloaded state.

With reference again to FIGS. 9A and 9B, the anti-tip device 190 can include a spacer or bumper 199 formed on the anti-tip device 190 to provide a stand-off between the assembly cart 100 and other assembly carts, for example, when the assembly cart 100 is stored with other assembly carts. For example, the anti-tip device 190 can include a spacer or bumper 199 coupled to a trailing surface (rear surface; e.g., of anti-tip part 196) of the anti-tip device 190, such as a rubber spacer or bumper, plastic spacer or bumper, or the like. The spacer or bumper 199 can provide additional clearance C2 between the doors loaded on the arms of the cart 100 and surfaces or parts of adjacent carts. For example, if an operator does not load a door completely onto an arm and a portion of the door extends past the end of the arm, a part of the door may come into contact with a part of the mast, gas cylinder, springs, etc., of an adjacent second cart, for example, when the carts are aligned in series, or when the carts are stored or being transported together. The spacer or bumper 199 can provide additional clearance C2 to minimize or prevent contact between such a door loaded on the arms of a first cart 100 and a part of the mast, gas cylinder, springs, etc., of an adjacent second cart or other object. The spacer or bumper 199 also can minimize damage to the cart or other carts resulting from contact between the cart 100 and another surface or cart.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. An unpowered, self-elevating and self-lowering home appliance assembly cart for supporting and transporting a plurality of home appliance assembly components, the assembly cart comprising:
   a base; and
   a self-leveling and self-lowering assembly component suspension and supporting system including:
      a mast;
      a rail system moveably coupled to the mast;
      a plurality of arms extending from the rail system, each pair of arms of the plurality of arms for supporting a home appliance assembly component of the plurality of home appliance assembly components at a respective position along a first vertical height along the rail system; and
      means for automatically self-leveling and self-lowering the rail system with respect to the mast to position the pair of arms of the plurality of arms within a predetermined acceptable ergonomic work zone with respect to a second vertical height along the mast based on an unloaded state, a partially loaded state, and a loaded state of the plurality of arms, the predetermined acceptable ergonomic work zone for loading and unloading the home appliance assembly component from the pair of arms,
      wherein an upper part of the rail system is configured to extend above the second vertical height of the mast when the assembly cart is in the unloaded state such that a lowermost pair of arms of the plurality of arms on the rail system is positioned within the predetermined acceptable ergonomic work zone when the assembly cart is in the unloaded state, and
      wherein the rail system is configured to be positioned with respect to the mast when the assembly cart is in the partially loaded state or the loaded state such that an uppermost pair of arms of the plurality of arms is positioned within the predetermined acceptable ergonomic work zone when the assembly cart is in the partially loaded state or the loaded state.

2. The home appliance assembly cart of claim 1, wherein the means for automatically self-leveling and self-lowering the pair of arms includes:
   a gas cylinder coupled between the mast and rail system.

3. The home appliance assembly cart of claim 2, wherein the means for automatically self-leveling and self-lowering the pair of arms further includes:
   a spring coupled between the mast and the rail system.

4. The home appliance assembly cart of claim 2, wherein the means for automatically self-leveling and self-lowering the pair of arms further includes:
   a pair of springs coupled between the mast and the rail system, each of the pair of springs disposed on opposing sides of the gas cylinder.

5. The home appliance assembly cart of claim 2, wherein the means for automatically self-leveling and self-lowering the pair of arms further includes:
   a first pair of springs coupled in series between the mast and the rail system and disposed on a first side of the gas cylinder; and
   a second pair of springs coupled in series between the mast and the rail system and disposed on a second side of the gas cylinder.

6. The home appliance assembly cart of claim 1, wherein the means for automatically self-leveling and self-lowering the pair of arms includes:
   an adjustable gas cylinder coupled between the mast and the rail system.

7. The home appliance assembly cart of claim 1, wherein the base includes transport support means and transport guide means.

8. The home appliance assembly cart of claim 1, wherein the base includes a pair of transport supports extending laterally from opposing sides of the base.

9. The home appliance assembly cart of claim 8, wherein one of the transport supports includes one of a tapered and a rounded end.

10. The home appliance assembly cart of claim 8, wherein one of the transport supports extends an entire length of a side of the base.

11. The home appliance assembly cart of claim 1, wherein the base includes a pair of guides extending downward from the base on opposing sides of the base.

12. The home appliance assembly cart of claim 11, wherein one of the guides includes an angled end.

13. The home appliance assembly cart of claim 11, wherein each of the guides includes an angled leading end and an angled trailing end.

14. The home appliance assembly cart of claim 11, wherein the base includes a plurality of casters coupled to a bottom surface of the base, and
   wherein the guides are disposed between each of the plurality of casters and an outside edge of the base such that the guides are disposed laterally outside of the plurality of casters with respect to the base.

15. The home appliance assembly cart of claim 1, wherein the base includes anti-tipping means for preventing accidental tipping of the assembly cart.

16. The home appliance assembly cart of claim 1, wherein the means for automatically self-leveling and self-lowering the pair of arms automatically self-levels and self-lowers the pair of arms to a position within the predetermined acceptable ergonomic work zone based on a predetermined threshold total weight of the assembly components loaded on the plurality of arms.

17. The home appliance assembly cart of claim 1, wherein the means for automatically self-leveling and self-lowering the pair of arms automatically self-levels and self-lowers the pair of arms to a position within the predetermined acceptable ergonomic work zone based on a predetermined range of assembly component weights.

18. The home appliance assembly cart of claim 1, wherein the means for automatically self-leveling and self-lowering the pair of arms is adjustable to automatically self-level and self-lower the pair of arms to a position within the predetermined acceptable ergonomic work zone based on a plurality of ranges of assembly component weights.

19. The home appliance assembly cart of claim 1, wherein the home appliance assembly cart is a home appliance oven door assembly cart for supporting and transporting a plurality of home appliance oven doors, and
   wherein the home appliance assembly component includes an oven door of the plurality of home appliance oven doors.

20. The home appliance assembly cart of claim 1,
   wherein the mast includes a pair of vertical masts, each of the pair of vertical masts having an opening extending along a vertical edge, and
   wherein the rail system includes a pair of vertical rails, each rail of the pair of vertical rails being guided within the respective opening of each of the pair of vertical masts.

21. The home appliance assembly cart of claim 20, wherein the rail system includes a plurality of rollers on each of the pair of vertical rails between each rail and a surface of the respective vertical mast for reducing friction between the rail system and the mast.

22. The home appliance assembly cart of claim 21, wherein the plurality of rollers are disposed within the opening of each of the pair of vertical masts, and
wherein each of the pair of vertical masts permits vertical movement of the plurality of rollers with respect to the mast and prevents lateral movement of the plurality of rollers with respect to the mast.

23. An unpowered, self-elevating and self-lowering home appliance assembly cart for supporting and transporting a plurality of home appliance assembly components, the assembly cart comprising:
a base; and
a self-leveling and self-lowering assembly component suspension and supporting system including:
a mast;
a rail system moveably coupled to the mast;
a plurality of arms extending from the rail system, each pair of arms of the plurality of arms for supporting a home appliance assembly component of the plurality of home appliance assembly components; and
means for automatically self-leveling and self-lowering the pair of arms of the plurality of arms to a position within a predetermined acceptable ergonomic work zone with respect to a vertical height along the mast based on an unloaded state, a partially loaded state, and a loaded state of the plurality of arms, the predetermined acceptable ergonomic work zone for loading and unloading the home appliance assembly component from the pair of arms,
wherein the plurality of arms includes a first arm and a second arm,
wherein the first arm includes means for protecting the first arm and for sliding the home appliance assembly component over an upper surface of the first arm, and
wherein the second arm include gripping means for preventing sliding of the home appliance assembly component over an upper surface of the second arm.

24. The home appliance assembly cart of claim 23, wherein each of the plurality of arms includes an end cap.

25. The home appliance assembly cart of claim 23, wherein each of the plurality of arms includes means for protecting a lower surface of each of each of the plurality of arms.

26. The home appliance assembly cart of claim 23, wherein the mast includes edge protection means for protecting the home appliance assembly component from being damaged by contact with an edge of the mast.

27. An unpowered, self-elevating and self-lowering home appliance assembly cart for supporting and transporting a plurality of home appliance assembly components, the assembly cart comprising:
a base; and
a self-leveling and self-lowering door suspension and supporting system including:
a mast;
a rail system moveably coupled to the mast;
a plurality of arms extending from the rail system, each pair of arms of the plurality of arms for supporting a home appliance assembly component of the plurality of home appliance assembly components at a respective position along a first vertical height along the rail system; and
a self-leveling and self-lowering device that automatically self-levels and self-lowers the rail system with respect to the mast to position the pair of arms of the plurality of arms within a predetermined acceptable ergonomic work zone with respect to a second vertical height along the mast based on an unloaded state, a partially loaded state, and a loaded state of the plurality of arms, the predetermined acceptable ergonomic work zone being for loading and unloading the home appliance assembly component from the pair of arms,
wherein the self-leveling and self-lowering device includes:
a gas cylinder coupled between the mast and the rail system; and
a spring coupled between the mast and the rail system, and
wherein an upper part of the rail system is configured to extend above the second vertical height of the mast when the assembly cart is in the unloaded state such that a lowermost pair of arms of the plurality of arms on the rail system is positioned within the predetermined acceptable ergonomic work zone when the assembly cart is in the unloaded state, and the rail system is configured to be positioned with respect to the mast when the assembly cart is in the partially loaded state or the loaded state such that an uppermost pair of arms of the plurality of arms is positioned within the predetermined acceptable ergonomic work zone when the assembly cart is in the partially loaded state or the loaded state, thereby maximizing a number of the home appliance assembly components that can be carried by the assembly cart while simultaneously being configured such that an operator can load and/or unload each assembly component at a height that is within the predetermined acceptable ergonomic work zone.

28. The home appliance assembly cart of claim 27, wherein the home appliance assembly cart is a home appliance oven door assembly cart for supporting and transporting a plurality of home appliance oven doors, and
wherein the home appliance assembly component includes an oven door of the plurality of home appliance oven doors.

* * * * *